(12) United States Patent
Dessendier et al.

(10) Patent No.: US 10,562,985 B2
(45) Date of Patent: Feb. 18, 2020

(54) MODIFIED DIENE ELASTOMER WITH REDUCED PDI AND COMPOSITION CONTAINING SAME

(71) Applicant: COMPAGNIE GENERALE DES ETABLISSEMENTS MICHELIN, Clermont-Ferrand (FR)

(72) Inventors: Marie-Hélène Dessendier, Clermont-Ferrand (FR); Charlotte Dire, Clermont-Ferrand (FR); Margarita Dorato, Clermont-Ferrand (FR); Jean Marc Marechal, Clermont-Ferrand (FR); Florent Vaultier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 95 days.

(21) Appl. No.: 15/740,644

(22) PCT Filed: Jul. 1, 2016

(86) PCT No.: PCT/EP2016/065592
§ 371 (c)(1),
(2) Date: Dec. 28, 2017

(87) PCT Pub. No.: WO2017/001683
PCT Pub. Date: Jan. 5, 2017

(65) Prior Publication Data
US 2018/0194866 A1    Jul. 12, 2018

(30) Foreign Application Priority Data

Jul. 2, 2015 (FR) ...................................... 15 56253

(51) Int. Cl.
| | | |
|---|---|---|
| C08C 19/25 | (2006.01) | |
| B60C 1/00 | (2006.01) | |
| C08C 19/00 | (2006.01) | |
| C08L 9/06 | (2006.01) | |

(52) U.S. Cl.
CPC ............ *C08C 19/25* (2013.01); *B60C 1/0016* (2013.01); *C08C 19/00* (2013.01); *C08L 9/06* (2013.01); *C08L 2205/025* (2013.01); *C08L 2312/02* (2013.01)

(58) Field of Classification Search
CPC ..... C08C 19/25; C08C 19/00; C08L 2312/02; C08L 2205/025; C08L 9/06; B60C 1/0016
USPC ......................................................... 524/572
See application file for complete search history.

(56) References Cited

U.S. PATENT DOCUMENTS

| | | | |
|---|---|---|---|
| 2013/0289163 A1* | 10/2013 | Abad ...................... | C08C 19/26 523/156 |
| 2016/0176991 A1 | 6/2016 | Dire et al. | |
| 2016/0280806 A1 | 9/2016 | Dire et al. | |

FOREIGN PATENT DOCUMENTS

| | | |
|---|---|---|
| FR | 3012454 A1 | 5/2015 |
| WO | 2015018599 A1 | 2/2015 |

OTHER PUBLICATIONS

International Search Report for PCT/EP2016/065592 dated Aug. 31, 2016.

* cited by examiner

*Primary Examiner* — Hui H Chin
(74) *Attorney, Agent, or Firm* — Dickinson Wright PLLC (57) ABSTRACT

A modified diene elastomer is provided. The elastomer comprises:
- at least 70% by weight, with respect to the total weight of the modified diene elastomer, of a linear diene elastomer functionalized predominantly in the middle of the chain by an alkoxysilane group, optionally partially or completely hydrolysed to give silanol, the alkoxysilane group optionally bearing another functional group capable of interacting with a reinforcing filler, the alkoxysilane group bonded to the two branches of the diene elastomer via the silicon atom, the functionalized diene elastomer exhibiting a polydispersity index before fractionalization of less than or equal to 1.6; and
- more than 0 and up to 30% by weight, with respect to the total weight of the modified diene elastomer, of a star-branched diene elastomer exhibiting a polydispersity index before star-branching of less than or equal to 1.6, the Mooney viscosity of the modified diene elastomer varying from 30 to 80.

18 Claims, 2 Drawing Sheets

MODIFIED DIENE ELASTOMER WITH REDUCED PDI AND COMPOSITION CONTAINING SAME

This application is a 371 national phase entry of PCT/EP2016/065592, filed 1 Jul. 2016, which claims benefit of French Patent Application No. 1556253, filed 2 Jul. 2015, the entire contents of which are incorporated herein by reference for all purposes.

BACKGROUND

1. Technical Field

The invention relates to a modified diene elastomer comprising at least 70% by weight of a specific linear diene elastomer functionalized predominantly in the middle of the chain by an alkoxysilane group, optionally partially or completely hydrolysed, bearing, if appropriate, another functional group capable of interacting with a reinforcing filler within a rubber composition, and at most 30% by weight of a specific star-branched diene elastomer, the Mooney viscosity of the modified diene elastomer varying from 30 to 80.

2. Related Art

Now that savings in fuel and the need to protect the environment have become a priority, it is desirable to produce mixtures having a hysteresis which is as low as possible in order to be able to process them in the form of rubber compositions which can be used in the manufacture of various semi-finished products participating in the composition of tire casings, such as, for example, underlayers, sidewalk or treads, and in order to obtain tires having a reduced rolling resistance.

The reduction in the hysteresis of the mixtures is an ongoing objective which has, however, to be done while retaining the suitability for processing, in particular in the raw state, of the mixtures, while at the same time maintaining the resistance to flow of the elastomers.

Many solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer, thus modified, and the filler, whether this is carbon black or a reinforcing inorganic filler.

In the context of mixtures containing a reinforcing inorganic filler, it has been proposed to use diene copolymers functionalized by alkoxysilane derivatives.

Mention may be made, by way of illustration of this prior art, for example, of U.S. Pat. No. 5,066,721, which describes a rubber composition comprising a diene polymer functionalized by an alkoxysilane having at least one non-hydrolysable alkoxyl residue as a mixture with silica. Mention may also be made of Patent Application EP A 0 299 074, which describes functionalized polymers comprising alkoxysilane functional groups at the chain end. These functionalized polymers have been described in the prior art as effective in reducing hysteresis and improving abrasion resistance; however, their properties remain insufficient to allow the processing of these polymers in compositions intended to constitute treads of tires.

Provision has also been made to combine the functionalization by alkoxysilane functional groups with functionalization by other functional groups, in particular amine functional groups. Thus, Patent EP 0 992 537 describes a rubber composition which comprises an extended elastomer functionalized at the chain end by an alkoxysilane functional group and bearing, at the other end or along its chain, one or more amine functional groups. Furthermore, provision has also been made to improve the properties of rubber compositions by using elastomers functionalized at the chain end by alkoxysilane functional groups bearing an amine group, whether this is as black, silica or hybrid mixture. Mention may be made, for example, of Patent Application US 2005/0203251, which describes a rubber composition reinforced by silica comprising an elastomer functionalized at the chain end by an alkoxysilane bearing an amine group. Nevertheless, it turns out that the compositions comprising elastomers thus functionalized, whether black, silica or hybrid mixtures, do not always exhibit a processing which is acceptable and a hysteresis which is satisfactory for use as tire tread.

The Applicant Companies have described, in the document WO 2009133068 A1, a functionalized diene elastomer essentially composed of the coupled entity of an elastomer having, within the chain, a group bearing an alkoxysilane functional group and an amine functional group, the silicon atom of this group bonding the two parts of the diene elastomer chain. This functionalized elastomer confers improved mechanical and dynamic properties on the composition in which it is present, in particular an improved hysteresis, while retaining a satisfactory raw processing, for the purpose in particular of use as tire tread.

It is an ongoing concern of designers of materials intended for the manufacture of tires to improve the compromise in mechanical and dynamic properties of the rubber compositions for the purpose of improving the performance of the tire in which they are present, without, however, damaging the stages of its manufacture or the properties of the elastomer. Thus, for example, the improvement in the compromise in properties must not be made to the detriment of the flow of the elastomer, which causes major disadvantages during the transportation and storage of rubbers.

Provision has been made in the past to add elastomers coupled or star-branched using additional coupling or star-branching agents comprising tin or silicon in order to limit the flow. Thus, Patent Application WO 2009/077837 describes elastomers functionalized at each chain end in combination with elastomers which are star-branched, particularly by silicon. However, the combinations illustrated result in a reinforced rubber composition, the processing/hysteresis compromise of which is not satisfactory for a tire application. The Applicant Companies have furthermore described, in Patent Application WO 2011/042507, a functionalized diene elastomer composed of a diene elastomer functionalized at one chain end by a silanol functional group and, in a certain proportion, of a coupled or star-branched diene elastomer based on tin. This elastomer confers, on a rubber composition in which it is present, hysteresis and processing properties which are satisfactory and acceptable for tire use, while exhibiting a significantly improved resistance to flow.

SUMMARY

The technical problem which the invention intends to solve is that of further improving the compromise in hysteresis and processing properties of a rubber composition for the purpose of a tire application, without damaging its manufacture or the properties of the elastomer present in this composition, in particular its resistance to flow.

This aim is achieved in that the inventors have just discovered, surprisingly, during their research studies, that a modified diene elastomer comprising at least 70% by weight, with respect to the total weight of the modified diene elastomer, of a linear diene elastomer functionalized predominantly in the middle of the chain by an alkoxysilane group, optionally partially or completely hydrolysed to give silanol, the alkoxysilane group optionally bearing another functional group capable of interacting with a reinforcing filler, the alkoxysilane group being bonded to the two branches of the diene elastomer via the silicon atom, the functionalized elastomer exhibiting a narrow molecular weight distribution before functionalization, and at most 30% by weight, with respect to the total weight of the modified diene elastomer, of a star-branched diene elastomer exhibiting a narrow molecular weight distribution before star-branching, the Mooney viscosity of the modified diene elastomer varying from 30 to 80, confers, on the rubber compositions containing it, an improvement in the raw processing/hysteresis compromise while keeping intact the resistance to flow of the elastomer.

A subject-matter of the invention is thus a modified diene elastomer comprising:

a) at least 70% by weight, with respect to the total weight of the modified diene elastomer, of a linear diene elastomer functionalized predominantly in the middle of the chain by an alkoxysilane group, optionally partially or completely hydrolysed to give silanol, the alkoxysilane group optionally bearing another functional group capable of interacting with a reinforcing filler, the alkoxysilane group being bonded to the two branches of the diene elastomer via the silicon atom, the functionalized diene elastomer exhibiting a polydispersity index before functionalization of less than or equal to 1.6, preferably ranging from 1.2 to 1.6, b) more than 0 and up to 30% by weight, with respect to the total weight of the modified diene elastomer, of a star-branched diene elastomer exhibiting a polydispersity index before star-branching of less than or equal to 1.6, preferably ranging from 1.2 to 1.6, the Mooney viscosity of the modified diene elastomer varying from 30 to 80.

A further subject-matter of the invention is a reinforced rubber composition based on at least one reinforcing filler and on an elastomer matrix comprising at least the modified diene elastomer.

DETAILED DESCRIPTION OF EXAMPLE EMBODIMENTS

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

In the present patent application, the term "predominantly" or "predominant", in connection with a compound, is understood to mean that this compound is predominant among the compounds of the same type in the composition, that is to say that it is the one which represents the biggest fraction by weight among the compounds of the same type. Thus, a "predominant" functional entity of a functionalized diene elastomer is that representing the biggest fraction by weight among the functionalized entities constituting the diene elastomer, with respect to the total weight of the functionalized diene elastomer. In a system comprising just one compound of a certain type, the latter is predominant within the meaning of the present invention.

In the present description, the term "modified diene elastomer" is understood to mean a diene elastomer which comprises a group comprising one or more heteroatoms.

This group can be located at the linear main elastomer chain end. It will then be said that the diene elastomer is functionalized at the chain end. It is generally an elastomer obtained by reaction of a living elastomer with a functionalization agent, that is to say any at least monofunctional molecule, the functional group being any type of chemical group known by a person skilled in the art to react with a living chain end.

This group can be located in the linear main elastomer chain. It will then be said that the diene elastomer is coupled or alternatively functionalized in the middle of the chain, in contrast to the position "at the chain end", although the group is not located precisely at the middle of the elastomer chain. It is generally an elastomer obtained by reaction of a living elastomer with a coupling agent, that is to say any at least difunctional molecule, the functional group being any type of chemical group known by a person skilled in the art to react with a living chain end.

This group can be central, to which n elastomer chains (n>2) are bonded, forming a star-branched structure. It will then be said that the diene elastomer is star-branched. It is generally an elastomer obtained by reaction of a living elastomer with a star-branching agent, that is to say any polyfunctional molecule, the functional group being any type of chemical group known by a person skilled in the art to react with a living chain end.

A person skilled in the art will understand that a functionalization reaction with an agent comprising more than one functional group which is reactive with regard to the living elastomer results in a mixture of entities functionalized at the chain end and in the middle of the chain, constituting the linear chains of the functionalized elastomer, and also, if appropriate, star-branched entities. Depending on the operating conditions, mainly the molar ratio of the functionalization agent to the living chains, certain entities are predominant in the mixture.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, diene elastomer is understood as meaning any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter contain from 20% to 99% by weight of diene units and from 1% to 80% by weight of vinylaromatic units.

The following in particular are suitable as conjugated dienes which can be used in the process in accordance with the invention: 1,3-butadiene, 2-methyl-1,3-butadiene, 2,3-di ($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, and the like.

The following in particular are suitable as vinylaromatic compounds: styrene, ortho-, meta- or para-methylstyrene, the "vinyltoluene" commercial mixture, para-(tert-butyl) styrene, methoxystyrenes, vinylmesitylene, divinylbenzene and vinylnaphthalene, and the like.

The diene elastomer is preferably selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The diene elastomer can have any microstructure which depends on the polymerization conditions used. The elastomer can be a block, statistical, sequential or microsequential elastomer, and the like, and can be prepared in dispersion or in solution. When an anionic polymerization is concerned, the microstructure of these elastomers can be determined by the presence or absence of a randomizing agent and the amounts of randomizing agent employed.

The term "polydispersity index" is understood to mean, within the meaning of the invention, the weight-average molecular weight/number-average molecular weight ratio. The weight-average and number-average molecular weights are measured by size exclusion chromatography.

The term "linear diene elastomer functionalized predominantly in the middle of the chain", i.e. the elastomer a), is understood to mean, according to the invention, the mixture of the linear entities of the functionalized elastomer, namely the linear chains functionalized at the chain end and the linear chains functionalized in the middle of the chain, the latter being predominant by weight in this mixture and preferably representing at least 50%, indeed even at least 70%, by weight of this mixture.

According to a preferred embodiment, the modified diene elastomer according to the invention comprises at least 80% by weight, with respect to the total weight of the modified diene elastomer, of the linear diene elastomer functionalized predominantly in the middle of the chain a).

According to another preferred embodiment, the modified diene elastomer according to the invention comprises at most 20% by weight, with respect to the total weight of the modified diene elastomer, of the star-branched diene elastomer b).

According to a particularly preferred embodiment, the modified diene elastomer according to the invention comprises at least 80% by weight, with respect to the total weight of the modified diene elastomer, of the linear diene elastomer functionalized predominantly in the middle of the chain a) and at most 20% by weight, with respect to the total weight of the modified diene elastomer, of the star-branched diene elastomer b).

According to an alternative form of the invention, the diene elastomer a) does not comprise another functional group than that comprising the silicon atom directly bonded to the elastomer chain (that is to say, the alkoxysilane group).

According to another alternative form of the invention, the diene elastomer a) also comprises another functional group capable of interacting with a reinforcing filler, this functional group advantageously being borne by the silicon of the alkoxysilane group, directly or via a spacer group. This alternative form is understood as not excluding the fact that the alkoxysilane group comprising the silicon atom directly bonded to the elastomer chain interacts favourably with the reinforcing filler.

The term "alkoxysilane group interacting favourably with the reinforcing filler" or "functional group capable of interacting with a reinforcing filler" is understood to mean any alkoxysilane group or functional group capable of forming, within a rubber composition reinforced by means of a filler, a physical or chemical bond with the filler. This interaction can be established, for example, via covalent, hydrogen, ionic and/or electrostatic bonds between the functional group and functional groups present on fillers.

The alkoxy radical of the alkoxysilane group can be of formula R'O—, where R' represents a substituted or unsubstituted $C_1$-$C_{10}$, indeed even $C_1$-$C_8$, alkyl group, preferably a $C_1$-$C_4$ alkyl group, more preferably methyl and ethyl.

The term "functional group capable of interacting with a reinforcing filler" is preferably understood to mean functional groups comprising at least one heteroatom chosen from N, S, O or P. Mention may be made, by way of example, among these functional groups, of primary, secondary or tertiary and cyclic or non-cyclic amines, isocyanates, imines, cyanos, the thiol functional group, carboxylates, epoxides and primary, secondary or tertiary phosphines.

Mention may thus be made, as secondary or tertiary amine functional group, of amines substituted by $C_1$-$C_{10}$, preferably $C_1$-$C_4$, alkyl radicals, more preferably a methyl or ethyl radical, or else cyclic amines forming a heterocycle comprising a nitrogen atom and at least one carbon atom, preferably from 2 to 6 carbon atoms. For example, the methylamino-, dimethyl amino-, ethylamino-, diethylamino-, propylamino-, dipropylamino-, butylamino-, pentylamino-, dipentylamino-, hexylamino-, dihexylamino- or hexamethyleneamino-groups, preferably the diethylamine- and dimethylamino-groups, are suitable.

Mention may be made, as imine functional group, of the ketimines. For example, the (1,3-dimethylbutylidene) amino-, (ethylidene)amino-, (1-methylpropylidene)amino-, (4-N,N-dimethylaminobenzylidene)amino-, (cyclohexylidene)amino-, dihydroimidazole and imidazole groups are suitable.

Mention may be made, as carboxylate functional group, of acrylates or methacrylates. Such a functional group is preferably a methacrylate.

Mention may be made, as epoxide functional group, of the epoxy or glycidyloxy groups.

Mention may be made, as secondary or tertiary phosphine functional group, of phosphines substituted by $C_1$-$C_{10}$, preferably $C_1$-$C_4$, alkyl radicals, more preferably a methyl or ethyl radical, or else diphenylphosphine. For example, the methylphosphino-, dimethylphosphino-, ethylphosphino-, diethylphosphino, ethylmethylphosphino- and diphenylphosphino-groups are suitable.

Preferably, the functional group capable of interacting with a reinforcing filler of the diene elastomer a) is a tertiary amine functional group, preferably a diethylamine or dimethylamine functional group.

According to an alternative form of the invention, the other functional group capable of interacting with a reinforcing filler is directly bonded to the silicon atom itself directly bonded to the diene elastomer.

According to another alternative form of the invention, the other functional group capable of interacting with a reinforcing filler and the silicon atom bonded to the diene elastomer are connected together by a spacer group which can be an atom or a group of atoms. The spacer group can be a saturated or unsaturated, cyclic or non-cyclic, linear or branched, divalent $C_1$-$C_{18}$ aliphatic hydrocarbon radical or a divalent $C_6$-$C_{18}$ aromatic hydrocarbon radical and can comprise one or more aromatic radicals and/or one or more heteroatoms. The hydrocarbon radical can optionally be substituted.

According to a preferred alternative form of the invention, the spacer group is a linear or branched, divalent $C_1$-$C_{10}$ aliphatic hydrocarbon radical, more preferably a linear divalent $C_1$-$C_5$ aliphatic hydrocarbon radical and more preferably still the linear divalent $C_3$ hydrocarbon radical.

The different aspects, preferred or nonpreferred, which precede and which relate in particular to the nature of the other functional group capable of interacting with a reinforcing filler, the nature of the spacer group, the nature of the alkoxysilane group and the nature of the diene elastomer can be combined with one another.

According to advantageous alternative forms of the invention, at least one of the four following characteristics is observed and preferably the four:

the other functional group capable of interacting with a reinforcing filler is a tertiary amine, more particularly a diethylamine- or dimethylamino-group, the spacer group is a linear $C_1$-$C_5$ hydrocarbon radical, more preferably still the linear $C_3$ hydrocarbon radical, the functional group comprising the silicon atom is a methoxysilane or ethoxysilane, optionally partially or completely hydrolysed to give silanol, the diene elastomer is a butadiene/styrene copolymer.

The star-branched diene elastomer b) is preferably a tin-based or silicon-based star-branched diene elastomer.

The star-branched diene elastomer b) is preferably a star-branched diene elastomer comprising three or four branches.

The diene elastomer functionalized in the middle of the chain a) and the star-branched diene elastomer b) can have, before functionalization and star-branching, the same microstructure or a different microstructure.

Preferably, the linear diene elastomer functionalized predominantly in the middle of the chain a) and the star-branched diene elastomer b) have, before functionalization and star-branching, the same microstructure.

Preferably again, the linear diene elastomer functionalized predominantly in the middle of the chain a) and the star-branched diene elastomer b) have, before functionalization and star-branching, the same microstructure and the same macrostructure.

The modified diene elastomer according to the invention can be obtained by means of a process as described below.

The first stage of a process for the preparation of the modified diene elastomer is the anionic polymerization of at least one conjugated diene monomer in the presence of a polymerization initiator.

Use may be made, as polymerization initiator, of any known monofunctional anionic initiator. However, an initiator comprising an alkali metal, such as lithium, is preferably used.

Those comprising a carbon-lithium bond are suitable in particular as organolithium initiators. Use will preferably be made of a hydrocarbon organolithium initiator not comprising a heteroatom. Representative compounds are aliphatic organolithium compounds, such as ethyllithium, n-butyllithium (n-BuLi), isobutyllithium, and the like.

The polymerization is preferably carried out in the presence of an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The polymerization can be carried out continuously or batchwise. The continuous polymerization can be carried out in a known way in one or more reactors assumed perfectly stirred by a person skilled in the art. In the case of the polymerization in several reactors, the number of reactors generally varies from 2 to 15 and preferably from 2 to 9.

The polymerization is generally carried out at a temperature varying from 20° C. to 150° C. and preferably from 30° C. to 12.0° C.

According to an implementation of the continuous process, the polymerization can advantageously be carried out in several reactors by controlling and by balancing the conversion in each reactor. For example, the maintenance in each reactor of an individual degree of conversion within a range of values which depends on the theoretical individual degree of conversion, calculated from the overall degree of conversion at the end of polymerization divided by the number of reactors, can contribute to a reduced polydispersity index of at most 1.6 being obtained. Preferably then, the individual degree of conversion can vary by more or less 20% from the overall conversion, with respect to this theoretical value.

It is known that the conversion in each reactor is controlled in particular by the temperature, the residence time, the amount of polar agent and the amount of monomer entering each reactor.

The balancing of the conversions in each reactor, as indicated above, makes it possible to minimize the polydispersity index.

According to a continuous implementation of the process, the polymerization in several reactors in series can advantageously be carried out by producing a temperature gradient in the range of temperatures indicated above, so that the temperature in each reactor is greater than or equal to the temperature of the reactor which immediately precedes it, the temperature of the final reactor being strictly greater than the temperature of the first reactor.

According to a continuous implementation of the process, the polymerization in several reactors in series can also advantageously be carried out with additional injections of solvents and/or of monomers in at least one other reactor than the first. These monomers and/or solvents are then purified so that the proportion of the number of dead chains in the stream at the outlet of the final polymerization reactor is less than 30%, preferably less than 10%, of the number of living chains initiated in the first reactor. The term "dead chains" is understood to mean the chains of polymers, the propagation of which has been halted by reaction with impurities and which are no longer reactive at polymerization outlets.

These implementations of the continuous polymerization process in several reactors can be combined with one another.

It is, of course, also possible to add, at the end of polymerization, a transmetallation agent in order to modify the reactivity of the living chain end.

The living diene elastomer resulting from the polymerization is subsequently functionalized in order to prepare the modified diene elastomer according to the invention.

According to a first alternative form of the preparation of the modified diene elastomer according to the invention, the linear diene elastomer functionalized predominantly in the middle of the chain a) and the star-branched diene elastomer b) are mixed in the appropriate proportions.

The linear diene elastomer functionalized predominantly in the middle of the chain a) can be obtained by reaction of the living diene elastomer resulting from the polymerization stage with a coupling agent capable of introducing, in the middle of the polymer chain, a hydrolysable or nonhydrolysable alkoxysilane group bearing, if appropriate, a functional group capable of interacting with a reinforcing filler within a rubber composition, the alkoxysilane group being bonded to the two branches of the diene elastomer via the silicon atom.

The star-branched diene elastomer b) can be obtained in a way known per se by reaction of the living chain end with a star-branching agent, that is to say any polyfunctional molecule, the functional group being any type of chemical group known by a person skilled in the art to react with a living chain end.

The mixing of the two elastomers can be carried out in an inert solvent, for example an aliphatic or alicyclic hydrocarbon, such as pentane, hexane, heptane, isooctane or cyclohexane, or an aromatic hydrocarbon, such as benzene, toluene or xylene, which can be the same as the polymerization solvent. The mixing will then be carried out at a temperature of between 20° C. and 120° C. and preferably in the vicinity of 30° C. to 110° C.

According to a second alternative form of the preparation of the modified diene elastomer according to the invention, the living diene elastomer resulting from the polymerization stage is subjected to the reaction of a star-branching agent and to that of a coupling agent capable of introducing, in the middle of the polymer chain, a hydrolysable or nonhydrolysable alkoxysilane group bearing, if appropriate, a functional group capable of interacting with a reinforcing filler within a rubber composition, the alkoxysilane group being bonded to the two branches of the diene elastomer via the silicon atom.

The coupling agent which can be used according to these two alternative forms of the invention can bear an alkoxysilanol functional group, which can be hydrolysed to give a silanol functional group, or also a non-hydrolysable alkoxysilane functional group, and optionally another functional group capable of interacting with a reinforcing filler, the two functional groups being directly bonded to one another or being bonded via a spacer group. The other functional group capable of interacting with a reinforcing filler and the spacer group are as defined above.

The coupling agent can be represented by the following formula (I):

in which:

Y is a saturated or unsaturated, cyclic or non-cyclic, divalent $C_1$-$C_{18}$ aliphatic hydrocarbon radical or divalent $C_6$-$C_{18}$ aromatic hydrocarbon radical, preferably a linear or branched, divalent $C_1$-$C_{10}$ aliphatic hydrocarbon radical, more preferably a linear divalent $C_1$-$C_5$ aliphatic hydrocarbon radical and more preferably still the linear $C_2$ or $C_3$ hydrocarbon radical, X is a hydrogen atom or a functional group capable of interacting with a reinforcing filler, the R' radicals, which are substituted or unsubstituted and identical or different, represent a $C_1$-$C_{10}$, indeed even $C_1$-$C_8$, alkyl group, preferably a $C_1$-$C_4$ alkyl group, more preferably methyl and ethyl.

The functional group capable of interacting with a reinforcing filler is as defined above.

According to an alternative form of the invention, the functional group capable of interacting with a reinforcing filler is a protected or unprotected primary amine, a protected or unprotected secondary amine or a tertiary amine. The nitrogen atom can then be substituted by two identical or different groups which can be a trialkylsilyl radical, the alkyl group having from 1 to 4 carbon atoms, or a $C_1$-$C_{10}$, preferably $C_1$-$C_4$, alkyl radical, more preferably a methyl or ethyl radical, or else the two substituents of the nitrogen form, with the latter, a heterocycle comprising a nitrogen atom and at least one carbon atom, preferably from 2 to 6 carbon atoms.

Mention may be made, for example, as coupling agent, of (N,N-dialkylaminopropyl)trialkoxysilanes, (N-alkylaminopropyl)trialkoxysilanes, the secondary amine functional group of which is protected by a trialkylsilyl group, and aminopropyltrialkoxysilanes, the primary amine functional group of which is protected by two trialkylsilyl groups.

Preferably, the coupling agent can be chosen from (3-N,N-dimethylaminopropyl)trimethoxysilane, (3-N,N-dimethylaminopropyl)triethoxysilane, (3-N,N-diethylaminopropyl)trimethoxysilane, (3-N,N-diethylaminopropyl)triethoxysilane, (3-N,N-dipropylaminopropyl)trimethoxysilane, (3-N,N-dipropylaminopropyl)triethoxysilane, (3-N,N-dibutylaminopropyl)trimethoxysilane, (3-N,N-dibutylaminopropyl)triethoxysilane, (3-N,N-dipentylaminopropyl)trimethoxysilane, (3-N,N-dipentylaminopropyl)triethoxysilane, (3-N,N-dihexylaminopropy)trimethoxysilane, (3-N,N-dihexylaminopropyl)triethoxysilane, (3-hexamethyleneaminopropyl)trimethoxysilane, (3-hexamethyleneaminopropyl)triethoxysilane, (3-morpholinopropyl)trimethoxysilane, (3-morpholinopropyl)triethoxysilane, (3-piperidinopropyl)

trimethoxysilane or (3-piperidinopropyl)triethoxysilane. More preferably, the coupling agent is (3-N,N-dimethylaminopropyl)trimethoxysilane.

Preferably, the coupling agent can be chosen from (3-N,N-methyltrimethylsilylaminopropyl)trimethoxysilane, (3-N,N-methyltrimethylsilylaminopropyl)triethoxysilane, (3-N,N-ethyltrimethylsilylaminopropyl)trimethoxysilane, (3-N,N-ethyltrimethylsilylaminopropyl)triethoxysilane, (3-N,N-propyltrimethylsilylaminopropyl)trimethoxysilane or (3-N,N-propyltrimethylsilylaminopropyl)triethoxysilane. More preferably, the coupling agent is (3-N,N-methyltrimethylsilylaminopropyl)trimethoxysilane.

Preferably, the coupling agent can be chosen from (3-N,N-bistrimethylsilylaminopropyl)trimethoxysilane and (3-N,N-bistrimethylsilylaminopropyl)trimethoxysilane and (3-N,N-bistrimethylsilylaminopropyl)triethoxysilane. More preferably, the coupling agent is (3-N,N-bistrimethylsilylaminopropyl)trimethoxysilane.

According to an alternative form of the invention, the functional group capable of interacting with a reinforcing filler is an isocyanate functional group. Preferably, the coupling agent can be chosen from (3-isocyanatopropyl)trimethoxysilane and (3-isocyanatopropyl)triethoxysilane.

According to an alternative form of the invention, the functional group capable of interacting with a reinforcing filler is an imine functional group. Preferably, the coupling agent can be chosen from N-(1,3-dimethylbutylidene)-3-(trimethoxysilyl)-1-propanamine, N-(1,3-dimethylbutylidene)-3-(triethoxysilyl)-1-propanamine, N-(1,3-methylethylidene)-3-(trimethoxysilyl)-1-propanamine, N-(1,3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylidene)-3-(triethoxysilyl)-1-propanamine, N-(4-N,N-dimethylaminobenzylidene)-3-(trimethoxysilyl)-1-propanamine, N-(4-N,N-dimethylaminobenzylidene)-3-(triethoxysilyl)-1-propanamine, N-(cyclohexylidene)-3-(trimethoxysilyl)-1-propanamine, N-(cyclohexylidene)-3-(triéthoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole or N-(3-triethoxysilylpropyl)-4,5-imidazole.

According to an alternative form of the invention, the functional group capable of interacting with a reinforcing filler is a cyano functional group. Preferably, the functionalization agent can be chosen from (3-cyanopropyl)trimethoxysilane and (3-cyanopropyl)triethoxysilane.

According to an alternative form of the invention, the functional group capable of interacting with a reinforcing filler is a protected or unprotected thiol functional group. Mention may be made, by way of example, of (S-trialkylsilylmercaptopropyl)trialkoxysilanes and (S-trialkylsilylmercaptoethyl)trialkoxysilanes. Preferably, the coupling agent can be chosen from (S-trimethylsilylmercaptopropyl)trimethoxysilane, (S-trimethylsilylmercaptopropyl)triethoxysilane, (S-tert-butyldimethylsilylmercaptopropyl)trimethoxysilane, (S-tert-dimethylmercaptopropyl)triethoxysilane, (S-trimethylsilylmercaptoethyl)trimethoxysilane, (S-trimethylsilylmercaptoethyl)triethoxysilane, (S-tert-butyldimethylsilylmercaptoethyl)trimethoxysilane or (S-tert-butyldimethylsilylmercaptoethyl)triethoxysilane.

According to an alternative form of the invention, the functional group capable of interacting with a reinforcing filler is a carboxylate functional group. Mention may be made, as carboxylate functional group, of acrylates or methacrylates. Such a functional group is preferably a methacrylate. Preferably, the coupling agent can be chosen from (3-methacryloyloxypropyl)trimethoxysilane and (3-methacryloyloxypropyl)triethoxysilane.

According to an alternative form of the invention, the functional group capable of interacting with a reinforcing filler is an epoxide functional group. Preferably, the coupling agent can be chosen from (2-glycidyloxyethyl)trimethoxysilane, (2-glycidyloxyethyl)triethoxysilane, (3-glycidyloxypropyl)trimethoxysilane, (3-glycidyloxypropyl)triethoxysilane, 2-(3,4-epoxycyclohexyl)ethyltrimethoxysilane or 2-(3,4-epoxycyclohexyl)ethyltriethoxysilane.

According to an alternative form of the invention, the functional group capable of interacting with a reinforcing filler is a protected or unprotected primary phosphine functional group, a protected or unprotected secondary phosphine functional group or a tertiary phosphine functional group. Preferably, the coupling agent can be chosen from (3-P,P-bistrimethylsilylphosphinopropyl)trimethoxysilane, (3-P,P-bistrimethylsilylphosphinopropyl)triethoxysilane, (3-methyltrimethylsilylphosphinopropyl)trimethoxysilane, (3-methyltrimethylsilylphosphinopropyl)triethoxysilane, (3-ethyltrimethylsilylphosphinopropyl)trimethoxysilane, (3-ethyltrimethylsilylphosphinopropyl)triethoxysilane, (3-dimethylphosphinopropyl)trimethoxysilane, (3-dimethylphosphinopropyl)triethoxysilane, (3-diethylphosphinopropyl)trimethoxysilane, (3-diethylphosphinopropyl)triethoxysilane, (3-ethylmethylphosphinopropyl)trimethoxysilane, (3-ethylmethylphosphinopropyl)triethoxysilane, (3-diphenylphosphinopropyl)trimethoxysilane or (3-diphenylphosphinopropyl)triethoxysilane.

The molar ratio of the coupling agent to the initiator of the living polymer chains varies from 0.30 to 0.80, preferably from 0.40 to 0.65 and more preferably still from 0.45 to 0.55.

According to the two alternative forms of the preparation of the modified diene elastomer of the invention, preferably, the star-branching agents are tin-based or silicon-based agents with a functionality of greater than 2 which can be represented by the formulae $SnR_1X'_3$, $SnHX'_3$, $SnX'_4$, $SiR_1X'_3$, $SiHX'_3$, $SiX'_4$, $SiR_1(OR'_1)_3$ and $Si(OR'_1)_4$, with $R_1$ and $R'_1$ independently being an alkyl, aralkyl or vinyl group having from 1 to 20 carbon atoms and X' being a halogen.

According to a specific embodiment of the second alternative form of the preparation of the modified diene elastomer according to the invention, the coupling agent and the star-branching agent are the same compound. According to this specific embodiment, the functionalization can advantageously be carried out continuously and in particular according to the procedures described in Application WO 2015018599 A1.

According to another embodiment of the second alternative form of the preparation of the modified diene elastomer according to the invention, the coupling agent and the star-branching agent are distinct. According to this specific embodiment, the functionalization of the living diene elastomer resulting from the polymerization stage can be carried out at a temperature varying from 20° C. to 120° C., in the presence, to begin with, of an appropriate amount of a star-branching agent in order to star-branch at most 30% by weight of the living diene elastomer. Then, subsequently, the remaining living chains of the diene elastomer obtained after the first stage are functionalized by addition of a coupling agent capable of introducing, in the middle of the polymer chain, the alkoxysilane group bearing, if appropriate, a functional group capable of interacting with a reinforcing filler within a rubber composition and reaction with this agent.

According to the alternative forms of the invention according to which the functionalization agent bears a protected primary or secondary amine functional group, the synthesis process can be continued by a stage of deprotection of the primary or secondary amine. This stage is carried out after the modification reaction. The chains functionalized by the protected amine group can, by way of example, be reacted with an acid, a base, a fluorinated derivative, such as tetrabutylammonium fluoride, a silver salt, such as silver nitrate, and the like, in order to deprotect this amine functional group. These different methods are described in the work "Protective Groups in Organic Synthesis", T. W. Green and P. G. M. Wuts, Third Edition, 1999. This deprotection stage can have the effect of hydrolysing all or a portion of the hydrolysable alkoxysilane functional groups of the modified diene elastomer in order to convert them into silanol functional groups.

According to the alternative forms of the invention according to which the functionalization agent bears a protected thiol functional group, the synthesis process can be continued by a stage of deprotection of the thiol. This stage is carried out after the modification reaction. The chains functionalized by the protected thiol group can, by way of example, be reacted with water, an alcohol or an acid (hydrochloric acid, sulfuric acid, carboxylic acid). This deprotection stage can have the effect of hydrolysing all or a portion of the hydrolysable alkoxysilane functional groups of the modified diene elastomer in order to convert them into silanol functional groups.

According to the alternative forms of the invention according to which the functionalization agent bears a protected primary or secondary phosphine functional group, the synthesis process can be continued by a stage of deprotection of the phosphine. This stage is carried out after the modification reaction. The chains functionalized by the protected phosphine group can, by way of example, be reacted with water, an alcohol or an acid (hydrochloric acid, sulfuric acid, carboxylic acid). This deprotection stage can have the effect of hydrolysing all or a portion of the hydrolysable alkoxysilane functional groups of the modified diene elastomer in order to convert them into silanol functional groups.

According to alternative forms of the invention, the synthesis process can comprise a stage of hydrolysis of the hydrolysable alkoxysilane functional groups by addition of an acidic, basic or neutral compound, as described in the document EP 2 266 819 A1. The hydrolysable functional groups are then converted in all or in part into silanol functional groups.

The process for the synthesis of the modified diene elastomer according to the invention can be continued in a way known per se by the stages of recovery of the modified elastomer.

According to alternative forms of this process, these stages comprise a stripping stage for the purpose of recovering the elastomer resulting from the prior stages in dry form. This stripping stage can have the effect of hydrolysing all or a portion of the hydrolysable alkoxysilane functional groups of the modified diene elastomer in order to convert them into silanol functional groups. Advantageously, at least 50 mol % to 70 mol % of the functional groups can thus be hydrolysed.

The modified diene elastomer in accordance with the invention exhibits a satisfactory resistance to flow, which induces good behaviour during the storage and transportation of this rubber.

The modified diene elastomer according to the invention can be advantageously used, for a tire application, in a rubber composition reinforced with at least one inorganic filler, such as silica, the raw processing/hysteresis compromise of which it improves. This rubber composition is also the subject-matter of the invention.

Thus, as explained above, another subject-matter of the invention is a reinforced rubber composition based on at least one reinforcing filler and on an elastomer matrix comprising at least one modified diene elastomer as described above. It should be understood that the rubber composition can comprise one or more of these modified diene elastomers according to the invention.

The reinforced rubber composition according to the invention can be provided in the crosslinked state or in the non-crosslinked, in other words crosslinkable, state.

The modified diene elastomer according to the invention can, according to different alternative forms, be used alone in the composition or as a blend with at least one other conventional diene elastomer, whether or not star-branched, coupled or functionalized. Preferably, this other diene elastomer used in the invention is selected from the group of highly unsaturated diene elastomers consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRS) and isoprene/butadiene/styrene copolymers (SBIRs). It is also possible to envisage a blend with any synthetic elastomer other than a diene elastomer, indeed even with any polymer other than an elastomer, for example a thermoplastic polymer.

When the conventional elastomer used in blending is natural rubber and/or one or more diene polymers, such as, for example, polybutadienes, polyisoprenes or butadiene/styrene or butadiene/styrene/isoprene copolymers, this elastomer or these elastomers, modified or unmodified, can then be present at from 1 to 70 parts by weight per 100 parts of modified diene elastomer according to the invention.

It should be noted that the improvement in the properties of the composition according to the invention will be greater as the proportion of the elastomer(s) different from the modified diene elastomers of the invention in this composition becomes lower.

Thus, preferably, the elastomer matrix predominantly comprises by weight the modified diene elastomer according to the invention.

More preferably, the elastomer matrix is composed solely of the modified diene elastomer according to the invention.

The rubber composition of the invention comprises, besides at least one elastomer matrix as described above, at least one reinforcing filler.

Use may be made of any type of reinforcing filler known for its abilities to reinforce a rubber composition which can be used in the manufacture of tire treads, for example carbon black, a reinforcing inorganic filler, such as silica, with which is combined, in a known way, a coupling agent, or also a mixture of these two types of filler.

All carbon blacks, used individually or in the form of mixtures, in particular blacks of the HAF, ISAF or SAF type, conventionally used in the treads of tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks.

"Reinforcing inorganic filler" should be understood, in the present patent application, by definition, as any inorganic or mineral filler, whatever its colour and its origin (natural or synthetic), capable of reinforcing by itself alone, without means other than an intermediate coupling agent, a rubber composition intended for the manufacture of tires; such a filler is generally characterized, in a known way, by the presence of hydroxyl (—OH) groups at its surface.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$ and in particular between 60 and 300 $m^2/g$. Mention will also be made of mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087. Also suitable as reinforcing fillers are reinforcing fillers of another nature, in particular carbon black, provided that these reinforcing fillers are covered with a siliceous layer or else comprise, at their surface, functional sites, in particular hydroxyl sites, requiring the use of a coupling agent in order to establish the bond between the filler and the elastomer. By way of example, mention may be made, for example, of carbon blacks for tires, such as described, for example, in patent documents WO 96/37547 and WO 99/28380.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing fillers, in particular of highly dispersible siliceous fillers as described above.

Preferably, the content of total reinforcing filler (carbon black and/or other reinforcing filler, such as silica) is between 10 and 200 phr, more preferably between 30 and 150 phr and more preferably still between 70 and 130 phr, the optimum being, in a known way, different according to the specific applications targeted.

According to an alternative form of the invention, the reinforcing filler is predominantly other than carbon black, that is to say that it comprises more than 50% by weight of the total weight of the reinforcing filler of one or more tillers other than carbon black, in particular a reinforcing inorganic filler, such as silica, indeed even it consists exclusively of such a filler.

According to this alternative form, when carbon black is also present, it can be used at a content of less than 20 phr, more preferably of less than 10 phr (for example between 0.5 and 20 phr, in particular from 1 to 10 phr).

According to another alternative form of the invention, use is made of a reinforcing filler predominantly comprising carbon black and optionally silica or another inorganic filler.

When the reinforcing filler comprises a filler requiring the use of a coupling agent in order to establish the bond between the filler and the elastomer, the rubber composition according to the invention in addition conventionally comprises an agent capable of effectively providing this bond. When silica is present in the composition as reinforcing filler, use may be made, as coupling agents, of organosilanes, in particular alkoxysilane polysulfides or mercaptosilanes, or else of at least bifunctional polyorganosiloxanes.

Such a coupling agent should not be confused with the coupling agent used for the synthesis of the modified diene elastomer described above.

In the composition according to the invention, the content of coupling agent is advantageously less than 20 phr, it being understood that it is generally desirable to use as little of it as possible. Its content is preferably between 0.5 and 12 phr. The presence of the coupling agent depends on the presence of the reinforcing inorganic filler. Its content is easily adjusted by a person skilled in the art according to the content of this filler; it is typically of the order of 0.5% to 15% by weight, with respect to the amount of reinforcing inorganic filler other than carbon black.

The rubber composition according to the invention can also comprise, in addition to the coupling agents, coupling activators, agents for covering the fillers or more generally processing aids capable, in a known way, by virtue of an improvement in the dispersion of the filler in the rubber matrix and of a lowering of the viscosity of the composition, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with the invention can also contain reinforcing organic fillers which can replace all or a portion of the carbon blacks or of the other reinforcing inorganic fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

The rubber composition according to the invention can also comprise all or a portion of the usual additives generally used in elastomer compositions intended for the manufacture of tires, such as, for example, pigments, non-reinforcing fillers, protective agents, such as antiozone waxes, chemical antiozonants or antioxidants, antifatigue agents, plasticizing agents, reinforcing or plasticizing resins, methylene acceptors (for example, phenolic novolak resin) or methylene donors (for example, HMT or H3M), such as described, for example, in Application WO 02/10269, a crosslinking system based either on sulfur or on sulfur donors and/or on peroxide and/or on bismaleimides, vulcanization accelerators or vulcanization activators.

The composition is manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for the preparation of a composition according to the invention generally comprises:

(i) the implementation, at a maximum temperature of between 130° C. and 180° C., of a first step of thermomechanical working of the constituents of the composition comprising the modified diene elastomer according to the invention and a reinforcing filler, with the exception of a crosslinking system, then (ii) the implementation, at a temperature lower than the maximum temperature of the first step, of a second step of mechanical working during which the crosslinking system is incorporated.

This process can also comprise, prior to the implementation of the abovementioned stages (i) and (ii), the stages of the preparation of the modified diene elastomer according to the process described above.

Another subject-matter of the invention is a semi-finished article made of rubber for a tire, comprising a rubber composition according to the invention, which is crosslinkable or crosslinked, or consisting of such a composition.

The final composition thus obtained can subsequently be calendered, for example in the form of a sheet or of a plaque or also extruded, for example in order to form a rubber profiled element which can be used as a semi-finished rubber product intended for the tire.

Due to the improved hysteresis/raw processing compromise while maintaining the resistance to flow of the elastomer which characterizes a reinforced rubber composition according to the invention, it should be noted that such a composition can constitute any semi-finished product of the tire and very particularly the tread, reducing in particular its rolling resistance.

A final subject-matter of the invention is thus a tire comprising a semi-finished article according to the invention, in particular a tread.

The abovementioned characteristics of the present invention, and also others, will be better understood on reading the following description of several implementational examples of the invention, given by way of illustration and without limitation.

EXAMPLES

Measurements and Tests Used
Size Exclusion Chromatography
The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses ($M_n$) and weight-average molar masses ($M_w$) can be determined from commercial standards and the polydispersity index ($PI=M_w/M_n$) can be calculated via a "Moore" calibration.

There is no specific treatment of the polymer sample before analysis. The latter is simply dissolved in the elution solvent at a concentration of approximately 1 $g \cdot l^{-1}$. The solution is then filtered through a filter with a porosity of 0.45 µm before injection.

The apparatus used is a Waters Alliance chromatographic line. The elution solvent is either tetrahydrofuran or tetrahydrofuran+1 vol % of diisopropylamine+1 vol % of triethylamine, the flow rate is 1 $ml \cdot min^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 25% by weight (with respect to the weight of the polymer) of units of styrene type, 23% by weight (with respect to the butadiene part) of units of 1,2-type and 50% by weight (with respect to the butadiene part) of units of trans-1,4-type.

High-Resolution Size Exclusion Chromatography
The high-resolution SEC (HR SEC) technique is used to determine the percentages by weight of the various populations of chains present in a polymer sample.

There is no specific treatment of the polymer sample before analysis. The latter is simply dissolved in the elution solvent at a concentration of approximately 1 $g \cdot l^{-1}$. The solution is then filtered through a filter with a porosity of 0.45 µm before injection.

The apparatus used is a Waters Alliance 2695 chromatographic line. The elution solvent is tetrahydrofuran, the flow rate is 0.2 $ml \cdot min^{-1}$ and the temperature of the system is 35° C. A set of three identical columns in series is used (Shodex, length 300 mm, diameter 8 mm). The number of theoretical plates of the set of columns is greater than 22 000. The volume of the solution of the polymer sample injected is 50 µl. The detector is a Waters 2414 differential refractometer and the software for making use of the chromatographic data is the Waters Empower system.

The calculated molar masses are relative to a calibration curve produced for SBRs having the following microstructure: 25% by weight (with respect to the weight of the polymer) of units of styrene type, 23% by weight (with respect to the butadiene part) of units of 1,2-type and 50% by weight (with respect to the butadiene part) of units of trans-1,4-type.

Mooney Viscosity
For the polymers and rubber compositions, the Mooney viscosities $ML_{(1+4)}$100° C. are measured according to Standard ASTM D-1646.

Use is made of an oscillating consistometer as described in Standard ASTMD-1646. The Mooney plasticity measurement is carried out according to the following principle: the elastomer or the composition in the raw state (i.e., before curing) is moulded in a cylindrical chamber heated to 100° C. After preheating for one minute, the rotor rotates within the test specimen at 2 revolutions/minute and the working torque for maintaining this movement after rotating for 4 minutes is measured. The Mooney plasticity $ML_{(1+4)}$ is expressed in "Mooney unit" (MU, with 1 MU=0.83 N·m).

The difference between the Mooney viscosity of the composition and the Mooney viscosity of the elastomer makes it possible to measure the raw processability or processing. The smaller this difference, the better the raw processing.

Differential Calorimetry
The glass transition temperatures (Tg) of the elastomers are determined using a differential scanning calorimeter.

Near-Infrared (NIR) Spectroscopy
The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-291 performed using standard elastomers having a composition determined by $^{13}C$ NMR. The styrene content and the microstructure are then calculated from the NIR spectrum of an elastomer film having a thickness of approximately 730 µm. The spectrum is acquired in transmission mode between 4000 and 6200 cm$^{-1}$ with a resolution of 2 cm$^{-1}$ using a Brüker Tensor 37 Fourier-transform near-infrared spectrometer equipped with an InGaAs detector cooled by the Peltier effect.

Intrinsic Viscosity

The intrinsic viscosity of the elastomers at 25° C. is determined from 0.1 g·dl$^{-1}$ solution of elastomer in toluene, according to the following principle:

The intrinsic viscosity is determined by the measurement of the flow time t of the polymer solution and of the flow time $t_0$ of the toluene in a capillary tube.

The flow time of the toluene and the flow time of the 0.1 g·dl$^{-1}$ polymer solution are measured in an Ubbelohde tube (diameter of the capillary 0.46 mm, capacity from 18 to 22 ml) placed in a bath thermostatically controlled at 25-0.1° C.

The intrinsic viscosity is obtained by the following relationship:

$$h_{inh} = \frac{1}{C} \ln\left[\frac{(t)}{(t_o)}\right]$$

with:
C: concentration of the solution of polymer in toluene in g·dl$^{-1}$,
t: flow time of the solution of polymer in toluene in seconds,
$t_0$: flow time of the toluene in seconds,
$h_{inh}$: intrinsic viscosity expressed in dl·g$^{-1}$.

Cold Flow (CF$_{(1+6)}$100° C.)

It is a matter of measuring the weight of elastomer extruded through a calibrated die over a given time (6 hours) and under fixed conditions (T=100° C.). The die has a diameter of 6.35 mm and a thickness of 0.5 mm and is located at the bottom and at the centre of a hollowed-out cylindrical dish with a diameter of 52 mm.

40±4 g of elastomer, formed beforehand into a pellet (thickness of 2 cm and diameter of 52 mm), are placed in this device. A calibrated piston weighing 1 kg (−5 g) is positioned on the elastomer pellet. The assembly is subsequently placed in an oven at 100° C.±0.5° C.

As the conditions are not stabilized during the first hour in the oven, the product extruded at t=1 hour is cut off and then discarded.

The measurement is subsequently continued for 6 hours±5 min, during which the product is left in the oven. On conclusion of the 6 hours, the sample of product extruded is cut off and then weighed. The result of the measurement is the weight of elastomer weighed. The lower this result, the more resistant the elastomer is to cold flow.

Determination of the Distribution of the Entities of a Modified Elastomer

The method employed is a modelling method already set out in Patent Application WO 2015/018599 A1 on behalf of the Applicant Companies and described below.

1. Example of the Determination of the Ratio of Kinetic Constants (K) of the Kinetic Model of Functionalization in a Batchwise Stirred Reactor Experimental Determination of the Percentage by Weight of the Chains Functionalized at the Chain End, of the Chains Functionalized in the Middle of the Chain and of the Star-Branched (3 Branches) Chains and of the Jump in Viscosity as a Function of the (3-N,N-dimethylaminopropyl) trimethoxysilane/n-BuLi Molar Ratio 91.6 ml (70.5 g) of methylcyclohexane, 14.8 ml (9.65 g) of butadiene and 0.49 ml of a 0.078 mol·l$^{-1}$ solution of tetrahydrofurfuryl ether in methylcyclohexane are introduced into eleven 250 ml glass bottles (Steinie bottles). After neutralization of the impurities in the solution to be polymerized by addition of n-butyllithium (n-BuLi), 1.90 ml of 0.097 mol·l$^{-1}$ n-BuLi in methylcyclohexane are added. The polymerization is carried out at 60° C.

After 15 minutes, the degree of conversion of monomer reaches 95%. This content is determined by weighing an extract dried at 140° C. under a reduced pressure of 200 mmHg. A control bottle (bottle No. 1) is stopped with an excess of methanol with respect to the lithium. The "initial" intrinsic viscosity is 0.66 dl·g$^{-1}$. 0.88 ml of a 0.1 mol·l$^{-1}$ solution of (3-N,N-dimethylaminopropyl)trimethoxysilane in methylcyclohexane is added to the solutions of living polymer (0.48 molar eq. vs Li) present in bottles 2 to 9, 0.73 ml of this same solution is added to bottle 10 (0.40 molar eq. vs Li) and 1.83 ml of this same solution are added to bottle 11 (1.0 molar eq. vs Li). After reacting at 60° C. for 15 minutes, the solutions are antioxidized by addition of 0.4 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The polymers thus treated are separated from their solution by drying at 60° C. under reduced pressure and a nitrogen stream for 12 hours.

The "final" intrinsic viscosities, the jumps in viscosity, defined as the ratios of the "final" intrinsic viscosities to the "initial" intrinsic viscosity, and also the percentages by weight of the deactivated chains (P), of the chains functionalized at the chain end (PA), of the chains functionalized in the middle of the chain (P$_2$A) and of the star-branched chains (P$_3$A) are presented in Table 1 below.

TABLE 1

Change in the distribution of the entities P + PA/P$_2$A/P$_3$A and in the jump in viscosity as a function of the (3-N,N-dimethylaminopropyl)trimethoxysilane/n-BuLi molar ratio

| Bottle | (3-N,N-Dimethylaminopropyl) trimethoxysilane/Li molar ratio | Jump in viscosity | P + PA/P$_2$A/P$_3$A (wt. %) |
|---|---|---|---|
| 2 | 0.48 | | 12/77/10 |
| 3 | 0.48 | | 13/77/9 |
| 4 | 0.48 | | 13/78/9 |
| 5 | 0.48 | | 13/82/5 |
| 6 | 0.48 | | 13/83/5 |
| 7 | 0.48 | | 13/83/4 |
| 8 | 0.48 | | 14/83/4 |
| 9 | 0.48 | 1.54 | 11/84/4 |
| 10 | 0.40 | 1.61 | 15/53/25 |
| 11 | 1.00 | 1.09 | 72/20/7 |

The living diene elastomer is functionalized according to the reaction mechanism:

| Reaction | Mechanism |
|---|---|
| R1 | PLi + A $\overset{k_1}{\to}$ PA |
| R2 | PLi + PA $\overset{k_2}{\to}$ P$_2$A |
| R3 | PLi + P$_2$A $\overset{k_3}{\to}$ P$_3$A | where
A represents the functionalization agent,
represents a living elastomer chain,
PA represents the elastomer functionalized at the chain end,
P$_2$A represents the coupled elastomer, $P_3A$ represents the star-branched elastomer comprising three branches, and
$k_i$ represents the kinetic constant of the reaction Ri, being carried out according to the following rate law:

| Reactions | Reaction rate |
|---|---|
| R1 | $V_1 = k_1 \text{[PLi]} \text{[A]}$ |
| R2 | $V_2 = k_2 \text{[PLi]} \text{[PA]}$ |
| R3 | $V_3 = k_3 \text{[PLi]} \text{[P}_2\text{A]}$ | where
$k_1$, $k_2$ and $k_3$ are the kinetic constants respectively of the reactions R1, R2 and R3 (expressed in $(m^3/mol) \cdot s^{-1}$),
[PLi] is the concentration of living chains (expressed in mol/m$^3$),
[A] is the concentration of modification agent A (expressed in mol/m$^3$),
[PA] is the concentration of elastomer functionalized at the chain end (expressed in mol/m$^3$),
[$P_2A$] is the concentration of coupled elastomer (expressed in mol/m$^3$),
[$P_3A$] is the concentration of star-branched elastomer comprising three branches (expressed in mol/m$^3$),
the ratio K of the kinetic constants defined as:

$$K = \frac{k_1}{k_2} = \frac{k_2}{k_3}$$

being greater than 1.

The kinetic model for functionalization incorporated, according to a person skilled in the art, in a perfectly stirred batchwise reactor model (bibliography: Villermeaux, J; Génie de la réaction chimique; 1993) makes it possible to determine the distribution of the different entities. Furthermore, the chains can be deactivated (P) during the polymerization and/or functionalization stage. Thus, the final product is a mixture of deactivated elastomer (P), elastomer functionalized at the chain end (PA), elastomer functionalized in the middle of the chain ($P_2A$) and star-branched elastomer ($P_3A$).

For the experimental points of Table 1 above, the value of $K=10^{2\pm1}$ was estimated according to the description of the perfectly stirred batchwise reactor model, which represents the reactor used for these experiments.

Figure 1:
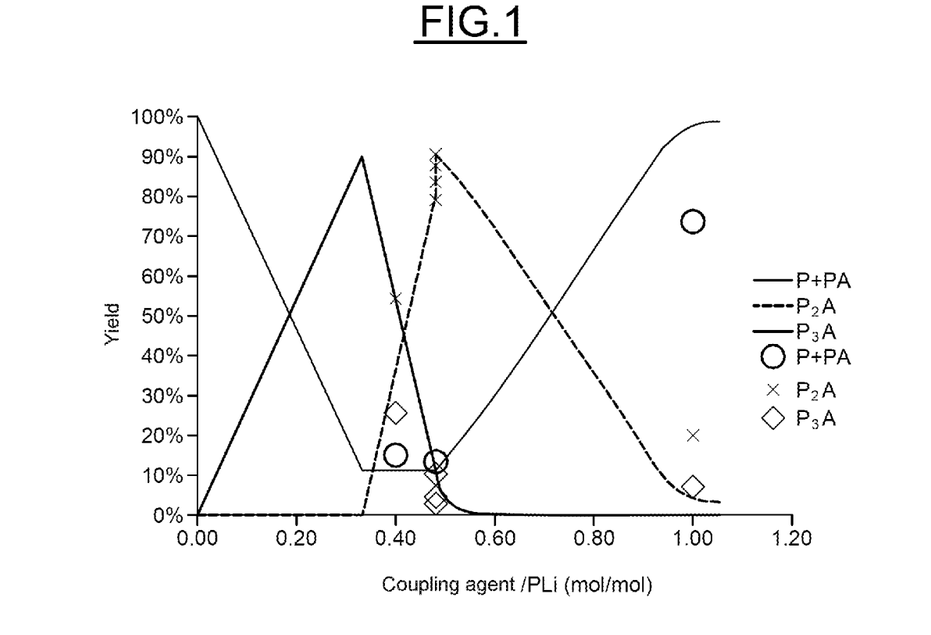
FIG. 1 is a graph illustrating distribution of entities P, PA, $P_2A$ and $P_3A$ as a function of functionalization agent/living polymer chains (PLi) molar ratio according to example embodiments.

The distribution of the entities P, PA, $P_2A$ and $P_3A$ as a function of the functionalization agent/living polymer chains (PLi) molar ratio is represented in FIG. 1: simulated (lines) and measured (points).

2. Example of the Determination of the Kinetics of Functionalization in a Batchwise Stirred Reactor Experimental Determination of the Percentage by Weight of the Chains Functionalized at the Chain End, of the Chains Functionalized in the Middle of the Chain and of the Star-Branched (3 Branches) Chains as a Function of the Coupling Time with (3-N,N-dimethylaminopropyl)trimethoxysilane (~0.5 mol eq. vs Li)

91.6 ml (70.5 g) of methylcyclohexane, 14.8 ml (9.65 g) of butadiene and 0.49 ml of a 0.078 mol·l$^{-1}$ solution of tetrahydrofurfuryl ether in methylcyclohexane are introduced into twenty-two 250 ml glass bottles (Steinie bottles). After neutralization of the impurities in the solution to be polymerized by addition of n-butyllithium (n-BuLi), 1.90 ml of 0.097 mol·l$^{-1}$ n-BuLi in methylcyclohexane are added. The polymerization is carried out at 60° C.

After 15 minutes, the degree of conversion of monomer reaches 95%. This content is determined by weighing an extract dried at 140° C. under a reduced pressure of 200 mmHg. 0.88 ml of a 0.1 mol·l$^{-1}$ solution of (3-N,N-dimethylaminopropyl)trimethoxysilane in methylcyclohexane are added to the living polymer solutions (0.48 molar eq. vs Li) present in the remaining twenty-one bottles. After reacting at 60° C. for 10 seconds (bottles 12, 13 and 14), 15 seconds (bottles 15, 16 and 17), 20 seconds (bottles 18, 19 and 20), 30 seconds (bottles 21 and 22), 2 minutes (bottle 23) and 15 minutes (bottles 24, 25, 26, 27, 28, 29, 30, 31 and 32), the solutions are antioxidized by addition of 0.4 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. The polymers thus treated are separated from their solution by drying at 60° C. under reduced pressure and a nitrogen stream for 12 hours.

The percentages by weight of the deactivated chains (P), of the chains functionalized at the chain end (PA), of the chains functionalized in the middle of the chain ($P_2A$) and of the star-branched chains ($P_3A$) are presented in Table 2 below.

TABLE 2

Change in the distribution of the entities P + PA/$P_2A$/$P_3A$ as a function of the reaction time with (3-N,N-dimethylaminopropyl)trimethoxysilane

| Bottle | Reaction time with (3-N,N-dimethylaminopropyl) trimethoxysilane | P + PA (wt. %) | $P_2A$ (wt. %) | $P_3A$ (wt. %) |
|---|---|---|---|---|
| 12 | 10 s | 23 | 76 | 1 |
| 13 | 10 s | 23 | 76 | 1 |
| 14 | 10 s | 22 | 77 | 1 |
| 15 | 15 s | 19 | 79 | 1 |
| 16 | 15 s | 20 | 79 | 1 |
| 17 | 15 s | 19 | 79 | 1 |
| 18 | 20 s | 18 | 81 | 1 |
| 19 | 20 s | 17 | 81 | 1 |
| 20 | 20 s | 18 | 81 | 1 |
| 21 | 30 s | 16 | 82 | 2 |
| 22 | 30 s | 14 | 83 | 2 |
| 23 | 2 min | 11 | 86 | 2 |
| 24 | 15 min | 12 | 77 | 10 |
| 25 | 15 min | 13 | 77 | 9 |
| 26 | 15 min | 13 | 78 | 9 |
| 27 | 15 min | 13 | 82 | 5 |
| 28 | 15 min | 13 | 83 | 4 |
| 29 | 15 min | 13 | 83 | 4 |
| 30 | 15 min | 14 | 83 | 4 |
| 31 | 15 min | 11 | 84 | 4 |
| 32 | 15 min | 9 | 88 | 3 |

Figure 2:
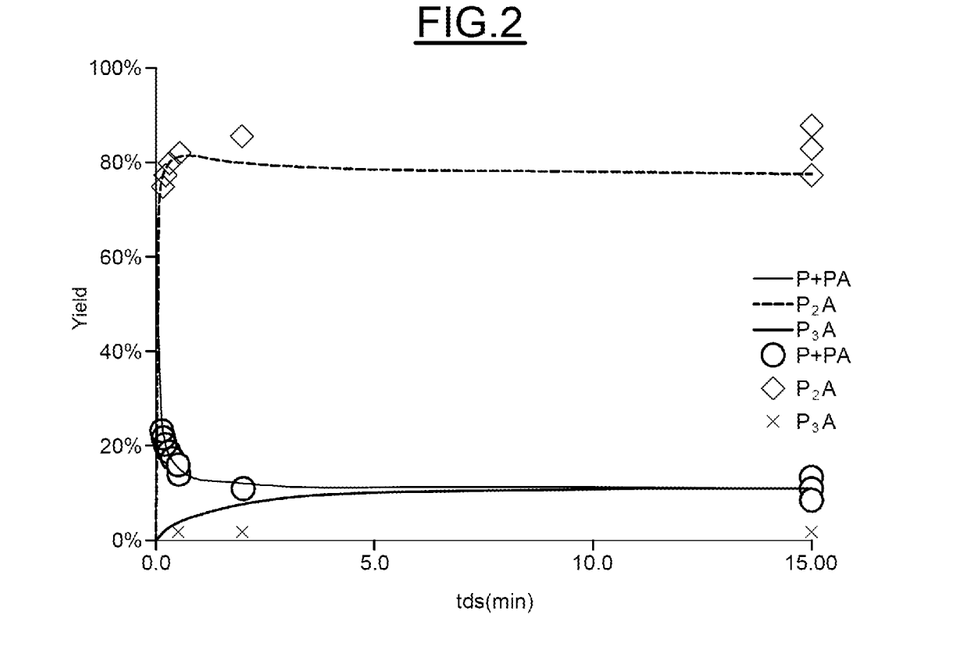
FIG. 2 is a graph illustrating simulated yields compared with measured yields according to example embodiments.

By using the same kinetic model as the preceding example and the value of $K=10^{2\pm1}$, the value of $k_1[\text{PLi}]$, in the kinetic model, is estimated at $10^{4\pm0.2}$. The simulated yields are compared with the measured yields as a function of the reaction time in a perfectly stirred batchwise reactor in FIG. 2.

3. Example of the Determination of the Ratio of Kinetic Constants (K of Functionalization in Continuous Configuration A variable amount of functionalization agent is injected into a continuous pilot-scale polymerization plant, at the outlet of the continuous stirred polymerization reactor, assumed perfectly stirred, in order to characterize the section of continuous functionalization. The functionalization section is composed of a static mixer of Kenics type comprising 36 4-litre elements and of a continuous stirred reactor with a volume of 32.5 litres, assumed perfectly stirred. The minimum residence time in the stirred reactors is 20 minutes.

Methyl cyclohexane, butadiene, styrene and tetrahydrofurfuryl ethyl ether are continuously introduced according to the following proportions: butadiene flow rate by weight=2.85 kg·h$^{-1}$, styrene flow rate by weight=1.25 kg·h$^{-1}$, concentration by weight of monomer=11 wt. %, 60 ppm of tetrahydrofurfuryl ethyl ether, into a 32.5-litre continuous stirred reactor, assumed perfectly stirred according to a person skilled in the art. n-Butyllithium (n-BuLi) is introduced in a sufficient amount in order to neutralize the protic impurities introduced by the different constituents present in the line inlet. 850 µmol of n-BuLi per 100 g of monomers are introduced at the inlet of the reactor.

The different flow rates are calculated in order for the mean residence time in the reactor to be 40 min. The temperature is maintained at 90° C.

The degree of conversion, measured on a sample withdrawn at the reactor outlet, is 92.6%.

At the outlet of the polymerization reactor, (3-N,N-dimethylaminopropyl)trimethoxysilane in solution in methylcyclohexane is added to the living polymer solution in different amounts (different (3-N,N-dimethylaminopropyl)trimethoxysilane/PLi molar ratios) in order to characterize the functionalization process. This solution is mixed in a static mixer composed of 36 mixing elements of Kenics KMR type and then passes through an empty pipe, the total residence time in the pipe being 3 minutes (static mixer+empty pipe), and a 32.5-litre continuous stirred reactor, assumed perfectly stirred according to a person skilled in the art, with a residence time of 40 minutes. The polymers are subsequently subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine.

The polymers thus treated are separated from their solution by a steam stripping operation and then dried on an open mill at 100° C.

Figure 3:
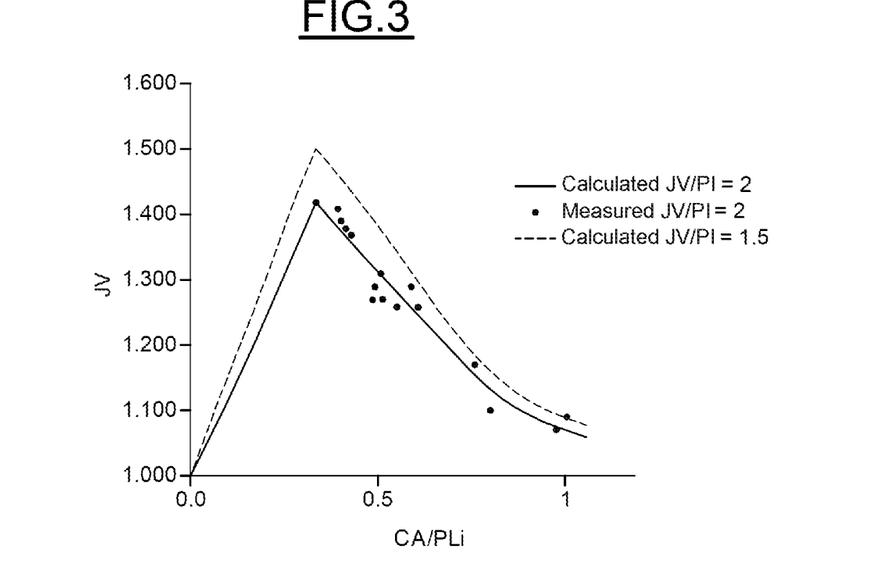
FIG. 3 is a graph illustrating intrinsic viscosities (JV) and value of K according to example embodiments.

The jumps in intrinsic viscosity (JV) measured for the elastomers with a PI of the order of 2 are presented in FIG. 3.

The kinetic model of functionalization described above is incorporated, according to a person skilled in the art, in a model of tubular reactor (representative of the Kenics static mixer), followed by a perfectly stirred continuous reactor (representative of the stirred functionalization reactor) (bibliography: Villermeaux, J; Génie de la réaction chimique; 1993) and makes it possible to determine the distribution of PLi, P, PA, P$_2$A and P$_3$A entities.

In order to make the connection between the distribution of the entities PLi, P, PA, P$_2$A and P$_3$A which is calculated by the kinetic model of functionalization and the experimental ratio of intrinsic viscosities before and after functionalization (JV), the JV is calculated theoretically by the equation below:

$$JV = \left( \frac{\sum_{i=1}^{n} w_{P_iA} \overline{M}_{w,P_iA}^{a} g_i'}{\overline{M}_{w,P}^{a}} \right)$$

where:
$w_{P_iA}$ is the fraction by weight of the entities $P_iA$, PLi and P;

$M_w$ is the weight-average molecular weight;
a is the parameter of the MHS (Mark-Houwink-Sakurada) equation and is equal to 0.75;
$g_i'$ is a correction for the star-branched polymers, for example:

$$g_i' = \left( \frac{3i-2}{i^2} \right)^b$$

where:
b is equal to 0.58 (work: Structure and Rheology of Molten Polymers),

By assuming that the residence time is long enough to be regarded as infinite, the ratio of kinetic constants K is estimated by minimizing the differences in experimental and calculated JV. The value of K is $10^{1\pm1}$, as represented in FIG. 3.

The calculated JV for elastomers exhibiting a PI of the order of 1.5 is also represented in FIG. 3.

Figure 4:
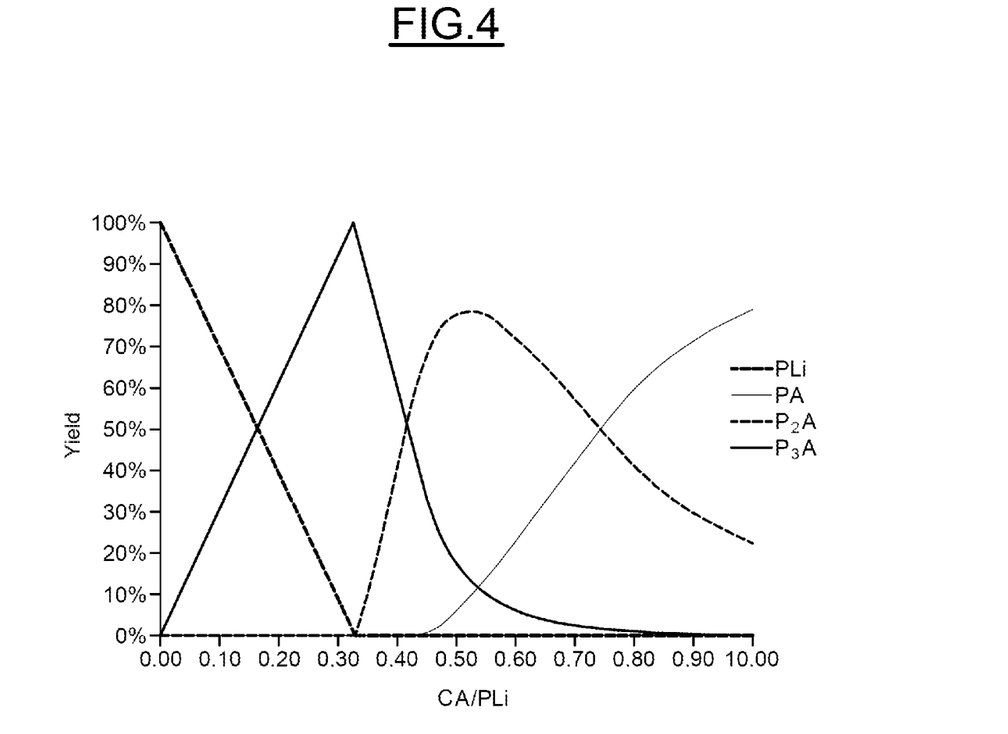
FIG. 4 is a graph illustrating calculated JV determined from a distribution of entities which is calculated by a kinetic model incorporated in models of tubular and perfectly stirred continuous reactors according to example embodiments.

The calculated JV is determined from the distribution of entities which is calculated by the kinetic model incorporated in the models of tubular and perfectly stirred continuous reactors (FIG. 4).

Dynamic Properties

The dynamic properties and in particular tan δ max are measured on a viscosity analyser (Metravib VA4000) according to Standard ASTM D 5992-96. The response of a sample of vulcanized composition (cylindrical test specimen with a thickness of 2 mm and a cross-section of 79 mm$^2$), subjected to a simple alternating sinusoidal shear stress, at a frequency of 10 Hz, under standard temperature conditions (40° C.) according to Standard ASTM D 1349-99, is recorded. A strain amplitude sweep is carried out from 0.1% to 50% peak-to-peak (outward cycle) and then from 50% to 0.1% peak-to-peak (return cycle). The result more particularly made use of is the loss factor tan δ. For the return cycle, the maximum value of tan δ observed, denoted tan δ max, is indicated. This value is representative of the hysteresis of the material and in the present case of the rolling resistance: the smaller the value of tan δ max, the lower the rolling resistance. In the examples, the results of the dynamic properties are given in base 100. The higher this number expressed in base 100, the lower the hysteresis.

Preparation of the Polymers

Preparation of the Polymer A: SBR aminoalkoxysilane-Functional in the Middle of the Chain According to the Invention Methylcyclohexane, butadiene, styrene and tetrahydrofurfuryl ethyl ether are continuously introduced into two fed 14-1 reactors arranged in series, assumed perfectly stirred according to a person skilled in the art, according to the following proportions: butadiene flow rate by weight=1.756 kg·h$^{-1}$ (1.231 kg·h$^{-1}$ of which are injected at the inlet of the first reactor and 0.525 kg·h$^{-1}$ of which are injected between the first and the second reactor after having been purified on alumina columns), styrene flow rate by weight=0.906 kg·h$^{-1}$, total concentration by weight of monomer in the second reactor=12.5 wt. %, tetrahydrofurfuryl ethyl ether flow rate by weight=134 g·h$^{-1}$.

n-Butyllithium (n-BuLi) is introduced in a sufficient amount in order to neutralize the protic impurities introduced by the different constituents present in the inlet of the first reactor. 720 µmol of n-BuLi per 100 g of monomer are introduced at the inlet of the first reactor.

The different flow rates are calculated in order for the mean residence time in the final reactor to be 30 min. The two reactors in series are respectively maintained at the following temperatures: 58° C. for the first and 85° C.' for the second.

A sample of polymer solution is withdrawn at the outlet of the second polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N-phenyl-p-phenylenediamine. The polymer thus treated is subsequently separated from its solution by a steam stripping operation and then dried on an open mill at 100° C. The "initial" intrinsic viscosity measured is 1.42 dl·g$^{-1}$. The number-average molar mass $M_n$, determined by the SEC technique, is 97 000 g·mol$^{-1}$ and the polydispersity index PI is 1.50.

At the outlet of the second polymerization reactor, 385 μmol per 100 g of monomer of (3-N,N-dimethylaminopropyl)trimethoxysilane (coupling and star-branching agent CA) in solution in methylcyclohexane are added to the solution of living polymer (CA/Li=0.53). This solution is mixed in a static mixer composed of 36 mixing elements of Kenics KMR type and in a 14-litre continuous stirred reactor, assumed perfectly stirred by a person skilled in the art, with a residence time of 30 minutes.

The polymer thus obtained is subjected to an antioxidizing treatment with addition of 0.4 phr of 2,2'-methylenebis (4-methyl-6-(test-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 1.91 dl·g$^{-1}$. The jump in viscosity, defined as the ratio of the "final" viscosity to the "initial" viscosity, is in this instance 1.34.

The Mooney viscosity of this polymer A is 70.

The number-average molar mass $M_n$, determined by the SEC technique, is 165 000 g·mol$^{-1}$ and the polydispersity index PI is 1.45.

The microstructure of this polymer is determined by the NIR method. The content of 1,2-units is 23.1%, with respect to the butadiene units. The content by weight of styrene is 27.7%.

The glass transition temperature of this polymer is −49° C.

The cold flow $CF_{(1+6)}$100° C. of the polymer is 2.1.

The distribution of the entities after functionalization is given with the modelling method described above: 87% of functional chains, 77% of which are functional in the middle of the chain, and 13% of star-branched chains.

Preparation of the Polymer B: SBR aminoalkoxysilane-Functional in the Middle of the Chain—Comparative Methylcyclohexane, butadiene, styrene and tetrahydrofurfuryl ethyl ether are continuously introduced according to the following proportions: butadiene flow rate by weight=1.22 kg·h$^{-1}$, styrene flow rate by weight=0.536 kg·h$^{-1}$, concentration by weight of monomer=11 wt. %, 60 ppm of tetrahydrofurfuryl ethyl ether, into a stirred continuously fed 14-1 reactor, assumed perfectly stirred according to a person skilled in the art. n-Butyllithium (n-BuLi) is introduced in a sufficient amount in order to neutralize the protic impurities introduced by the different constituents present in the inlet of the first reactor. 929 μmol of n-BuLi per 100 g of monomer are introduced at the inlet of the reactor.

The different flow rates are calculated in order for the mean residence time in the reactor to be 40 min. The temperature is maintained at 90° C.

A sample of polymer solution is withdrawn at the outlet of the polymerization reactor. The polymer thus obtained is subjected to an antioxidizing treatment with addition of 0.4 phr of 2,2'-methylenebis(4-methyl-6-(tert-butyl)phenol) and 0.2 phr of N-(1,3-dimethylbutyl)-N'-phenyl-p-phenylenediamine. The polymer thus treated is subsequently separated from its solution by a steam stripping operation and then dried on an open mill at 100° C. The "initial" intrinsic viscosity measured is 1.42 dl·g$^{-1}$. The number-average molar mass $M_n$, determined by the SEC technique, is 80 000 g·mol$^{-1}$ and the polydispersity index PI is 1.90 (which does not comply with the definition of the modified diene elastomers according to the invention).

At the outlet of the polymerization reactor, 474 μmol per 100 g of monomer of (3-N,N-dimethylaminopropyl) trimethoxysilane (coupling and star-branching agent CA) in solution in methylcyclohexane are added to the solution of living polymer (CA/Li=0.51). This solution is mixed in a static mixer composed of 36 mixing elements of Kenics KMR type and in a 14-litre continuous stirred reactor, assumed perfectly stirred by a person skilled in the art, with a residence time of 40 minutes.

The polymer thus obtained is subjected to an antioxidizing treatment with addition of 0.4 phr of 2,2'-methylenebis (4-methyl-6-(tert-butyl)phenol) and 0.2 phr of N-(1,3-dimethylbutyl)-N'-phenyl-p-phenylenediamine.

The polymer thus treated is subsequently separated from its solution by a steam stripping operation and then dried on an open mill at 100° C.

The "final" intrinsic viscosity measured is 1.90 dl·g$^{-1}$. The jump in viscosity, defined as the ratio of the "final" viscosity to the "initial" viscosity, is in this instance 1.30.

The Mooney viscosity of this polymer B is 56.

The number-average molar mass $M_n$, determined by the SEC technique, is 135 000 g·mol$^{-1}$ and the polydispersity index PI is 1.72.

The microstructure of this polymer is determined by the NIR method. The content of 1,2-units is 24.5%, with respect to the butadiene units. The content by weight of styrene is 27.5%.

The glass transition temperature of this polymer is −47° C.

The cold flow $CF_{(1+6)}$100° C. of the polymer is 1.6.

The distribution of the entities after functionalization is given with the modelling method described above: 84% of functional chains, 77% of which are functional in the middle of the chain, and 16% of star-branched chains.

Preparation of the Polymer C: SBR aminoalkoxysilane-Functional in the Middle of the Chain—Comparative Methylcyclohexane, butadiene, styrene and tetrahydrofurfuryl ethyl ether are continuously introduced into two stirred continuously fed 14-1 reactors arranged in series, assumed perfectly stirred according to a person skilled in the art, according to the following proportions: butadiene flow rate by weight=1.756 kg·h$^{-1}$ (1.231 kg·h$^{-1}$ of which are injected at the inlet of the first reactor and 0.525 kg·h$^{-1}$ of which are injected between the first and the second reactor after having been purified on alumina columns), styrene flow rate by weight=0.906 kg·h$^{-1}$, total concentration by weight of monomer in the second reactor=12.5 wt. %, tetrahydrofurfuryl ethyl ether flow rate by weight=134 g/h.

n-Butyllithium (n-BuLi) is introduced in a sufficient amount in order to neutralize the protic impurities introduced by the different constituents present at the inlet of the first reactor. 555 µmol of n-BuLi per 100 g of monomer are introduced at the inlet of the first reactor.

The different flow rates are calculated in order for the mean residence time in the final reactor to be 30 min. The two reactors in series are respectively maintained at the following temperatures: 58° C. for the first and 85° C. for the second.

A sample of polymer solution is withdrawn at the outlet of the second polymerization reactor. The polymer thus obtained is subsequently subjected to an antioxidizing treatment with addition of 0.4 phr of 2,2'-methylenebis(4-methyl-6-(tert-butyl)phenol) and 0.2 phr of N-(1,3-dimethylbutyl)-N-phenyl-p-phenylenediamine. The polymer thus treated is subsequently separated from its solution by a steam stripping operation and then dried on an open mill at 100° C. The "initial" intrinsic viscosity measured is 1.69 dl·g$^{-1}$. The number-average molar mass $M_n$, determined by the SEC technique, is 133 000 g·mol$^{-1}$ and the polydispersity index PI is 1.45.

At the outlet of the polymerization reactor, 305 µmol per 100 g of monomer of (3-N,N-dimethylaminopropyl)trimethoxysilane (coupling and star-branching agent CA) in solution in methylcyclohexane are added to the solution of living polymer (CA/Li=0.55). This solution is mixed in a static mixer composed of 36 mixing elements of Kenics KMR type and in a 14-litre continuous stirred reactor, assumed perfectly stirred by a person skilled in the art, with a residence time of 30 minutes.

The polymer thus obtained is subsequently subjected to an antioxidizing treatment with addition of 0.4 phr of 2,2'-methylenebis(4-methyl-6-(tert-butyl)phenol) and 0.2 phr of N-(1,3-dimethylbutyl)-N-phenyl-p-phenylenediamine.

The polymer thus treated is subsequently separated from its solution by a steam stripping operation and then dried on an open mill at 100° C.

The "final" intrinsic viscosity measured is 2.23 dl·g$^{-1}$. The jump in viscosity, defined as the ratio of the "final" viscosity to the "initial" viscosity, is in this instance 1.32.

The Mooney viscosity of this polymer C is 118 (which does not comply with the definition of the invention).

The number-average molar mass $M_n$, determined by the SEC technique, is 224 700 g·mol$^{-1}$ and the polydispersity index PI is 1.40.

The microstructure of this polymer is determined by the NIR method. The content of 1,2-units is 23.4%, with respect to the butadiene units. The content by weight of styrene is 27.7%.

The glass transition temperature of this polymer is −48° C.

The cold flow CF$_{(1+6)}$100° C. of the polymer is 0.26.

The distribution of the entities after functionalization is given with the modelling method described above: 90% of functional chains, 76% of which are functional in the middle of the chain, and 10% of star-branched chains.

Comparative Examples of Rubber Compositions

Three compositions given in Table 3 below are compared. Composition 1 is in accordance with the invention. Compositions 2 and 3 are comparative compositions not in accordance with the invention.

The formulations are expressed in percentage by weight per 100 parts by weight of elastomer (phr).

TABLE 3

| Composition | Example 1 | Comparative Examples 2 | 3 |
|---|---|---|---|
| Polymer A | 100 | | |
| Polymer B | | 100 | |
| Polymer C | | | 100 |
| Silica (1) | 80 | 80 | 80 |
| N234 | 3 | 3 | 3 |
| Resin Tg = 52° C. | 40 | 40 | 40 |
| Coupling agent (2) | 6.4 | 6.4 | 6.4 |
| ZnO | 0.9 | 0.9 | 0.9 |
| Stearic acid | 3 | 3 | 3 |
| Antioxidant (3) | 2.2 | 2.2 | 2.2 |
| Diphenylguanidine | 1.6 | 1.6 | 1.6 |
| Sulfur | 1 | 1 | 1 |
| Sulfenamide (4) | 2.3 | 2.3 | 2.3 |

(1) Silica, Zeosil 1165MP from Rhodia
(2) Si69 from Degussa
(3) N-(1,3-Dimethylbutyl)-N'-phenyl-p-phenylenediamine
(4) N-Cyclohexyl-2-benzothiazolesulfenamide The following procedure is used for the tests which follow:

Each of the compositions is produced, in a first step, by thermomechanical working and then, in a second finishing step, by mechanical working.

The elastomer, two-thirds of the silica, the coupling agent, the diphenylguanidine and the carbon black are introduced into a laboratory internal mixer of "Banbury" type which has a capacity of 400 cm$^3$, which is 72% filled and which has an initial temperature of 90° C.

The thermomechanical working is carried out by means of blades, the mean speed of which is 50 rev/min and the temperature of which is 90° C.

After one minute, the final one-third of the silica, the antioxidant, the stearic acid, the antiozone wax, the MES oil and the resin are introduced, still under thermomechanical working.

After two minutes, the zinc oxide is introduced, the speed of the blades being 50 rev/min.

The thermomechanical working is carried out for a further two minutes, up to a maximum dropping temperature of approximately 160° C.

The mixture thus obtained is recovered and cooled and then, in an external mixer (homofinisher), the sulfur and the sulfenamide are added at 30° C., the combined mixture being further mixed for a time of 3 to 4 minutes (second step of mechanical working).

The compositions thus obtained are subsequently calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads.

Crosslinking is carried out at 150° C. for 40 min.

The results are presented in Table 4.

TABLE 4

Rubber results
(Tan δ max 40° C., ML$_{(1+4)}$100° C. composition, Cold flow):

|  | Example | Comparative Examples | |
|---|---|---|---|
| Composition | 1 | 2 | 3 |
| Polymer | A | B | C |
| ML$_{(1+4)}$ 100° C. elastomer | 70 | 56 | 118 |
| Tan δ max 40° C. | 100 | 101 | 100 |
| ML$_{(1+4)}$ 100° C. composition | 80 | 75 | NM* |
| ML$_{(1+4)}$100° C. composition − ML$_{(1+4)}$100° C. elastomer | 10 | 19 | — |
| Cold flow (g/6 h) | 2.10 | 1.66 | 0.26 |

*Value not measurable as too high.

The results presented in Table 4 show an equivalent hysteresis between the composition 1 according to the invention in comparison with that of the control composition 2 (polymer B having a high polydispersity index before functionalization and star-branching) and with that of the control composition 3 (polymer C having a high Mooney viscosity).

The processability of the composition 1 according to the invention, which is given by difference between the Mooney viscosity of the composition and the Mooney viscosity of the elastomer, is significantly better than that of the control compositions 2 and 3.

Finally, the resistance to flow of the composition 1 is comparable to that of the control composition 2. Thus, the results presented in Table 4 demonstrate an improvement in the hysteresis/raw processing compromise of the composition containing the polymer according to the invention, while maintaining the resistance to flow of the elastomer.

The invention claimed is:

1. A modified diene elastomer comprising:
   a) at least 70% by weight, with respect to the total weight of the modified diene elastomer, of a linear diene elastomer functionalized predominantly in the middle of the chain by an alkoxysilane group, optionally partially or completely hydrolysed to give silanol, the alkoxysilane group optionally bearing another functional group capable of interacting with a reinforcing filler, the alkoxysilane group being bonded to the two branches of the diene elastomer via the silicon atom, the functionalized diene elastomer exhibiting a polydispersity index before functionalization of less than or equal to 1.6,
   b) more than 0 and up to 30% by weight, with respect to the total weight of the modified diene elastomer, of a star-branched diene elastomer exhibiting a polydispersity index before star-branching of less than or equal to 1.6,
   the Mooney viscosity of the modified diene elastomer varying from 30 to 80.

2. The modified diene elastomer according to claim 1, wherein the other functional group capable of interacting with a reinforcing filler of the diene elastomer a) is a functional group chosen from primary, secondary or tertiary and cyclic or non-cyclic amines, isocyanates, imines, cyanos, thiols, carboxylates, epoxides and primary, secondary or tertiary phosphines.

3. The modified diene elastomer according to claim 1, wherein the other functional group capable of interacting with a reinforcing filler of the diene elastomer a) is a tertiary amine functional group.

4. The modified diene elastomer according to claim 1, wherein the functional group capable of interacting with a reinforcing filler of the diene elastomer a) and the silicon atom bonded to the elastomer are connected to one another via a spacer group defined as being a saturated or unsaturated, cyclic or non-cyclic, linear or branched, divalent $C_1$-$C_{18}$ aliphatic hydrocarbon radical or a divalent $C_6$-$C_{18}$ aromatic hydrocarbon radical, the spacer group optionally comprising one or more aromatic radicals and/or one or more heteroatoms.

5. The modified diene elastomer according to claim 4, wherein the spacer group is a linear divalent $C_1$-$C_5$ aliphatic hydrocarbon radical.

6. The modified diene elastomer according to claim 1, wherein the alkoxysilane group is a methoxysilane or ethoxysilane group, optionally partially or completely hydrolysed to give silanol.

7. The modified diene elastomer according to claim 1, wherein the modified diene elastomer comprises at least 80% by weight, with respect to the total weight of the modified diene elastomer, of the linear diene elastomer a) functionalized predominantly in the middle of the chain.

8. The modified diene elastomer according to claim 1, wherein the modified diene elastomer comprises at most 20% by weight, with respect to the total weight of the modified diene elastomer, of the star-branched diene elastomer b).

9. The modified diene elastomer according to claim 1, wherein the star-branched diene elastomer is a tin-based or silicon-based star-branched elastomer.

10. The modified diene elastomer according to claim 1, wherein the star-branched diene elastomer b) is a star-branched diene elastomer comprising three or four branches.

11. The modified diene elastomer according to claim 1, wherein the diene elastomer is a copolymer of butadiene and of a vinylaromatic monomer.

12. The modified diene elastomer according to claim 1, wherein the diene elastomers a) and b) have, before functionalization and star-branching, the same microstructure and the same macrostructure.

13. A reinforced rubber composition based on at least one reinforcing filler and on an elastomer matrix comprising at least one modified diene elastomer as defined in claim 1.

14. The reinforced rubber composition according to claim 13, wherein the reinforcing filler(s) comprise(s) more than 50% by weight, with respect to the total weight of the reinforcing filler(s), of reinforcing inorganic filler.

15. The reinforced rubber composition according to claim 13, wherein the reinforcing inorganic filler consists of silica.

16. A semi-finished article made of rubber for a tire, wherein the rubber comprises a crosslinkable or crosslinked rubber composition according to claim 13.

17. The semi-finished article according to claim 16, wherein the article is a tread.

18. A tire comprising a semi-finished article as defined in claim 17.

* * * * *